US012756616B2

(12) United States Patent
Majjiga et al.

(10) Patent No.: US 12,756,616 B2
(45) Date of Patent: Oct. 6, 2026

(54) METHODS AND SYSTEMS FOR ARTIFICIAL INTELLIGENCE AGENT ORCHESTRATION AND SERVICE PROVISIONING THROUGH AGENTIC ARTIFICIAL INTELLIGENCE

(71) Applicant: Verizon Patent and Licensing Inc., Basking Ridge, NJ (US)

(72) Inventors: Deepak Majjiga, Irving, TX (US); Neeraj Bhatt, Vienna, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/043,674

(22) Filed: Feb. 3, 2025

(65) Prior Publication Data

US 2026/0230370 A1 Aug. 6, 2026

(51) Int. Cl.

| | |
|---|---|
| ***H04L 41/08*** | (2022.01) |
| ***G06F 9/455*** | (2018.01) |
| ***G06F 11/07*** | (2006.01) |
| ***H04L 41/046*** | (2022.01) |
| ***H04L 41/0695*** | (2022.01) |
| ***H04L 41/16*** | (2022.01) |

(52) U.S. Cl.
CPC ........ *H04L 41/046* (2013.01); *H04L 41/0695* (2013.01); *H04L 41/16* (2013.01)

(58) Field of Classification Search
CPC ... H04L 41/046; H04L 41/0695; H04L 41/16; H04L 41/08; G06F 11/07; G06F 9/455
USPC .......................................................... 709/223
See application file for complete search history.

(56) References Cited

U.S. PATENT DOCUMENTS

2025/0156303 A1* 5/2025 Stevens ............... G06F 11/0793
2026/0099313 A1 4/2026 Majjiga et al.

* cited by examiner

*Primary Examiner* — Jude Jean Gilles

(57) ABSTRACT

One or more computing devices, systems, and/or methods for orchestrating the deployment and operation of agents are provided. An agent is deployed to perform a task as part of network maintenance for a network component. The agent utilizes a model to execute procedural steps for performing the network maintenance. Skill and context instructions are generated and provided to the agent as parameters defining how the agent is to execute the procedural steps for interacting with the network component. Execution of the agent according to the skill and context instructions is monitored to determine whether operational limits, defined by a descriptor for the agent, are violated. In response to the agent violating the operational limits, the agent is terminated and a remedial action is performed.

20 Claims, 12 Drawing Sheets

502

ACTION PLAN

- A1 : Check Network Component (1) for deliveries
- A2 : Check Network Component (2) for scripts availability
- A3 : Check Network Component (3) for correct topology creation
- A4 : Check Network Component (4) for dependencies
- B1 : Get IPs for deployment
- B2 : Create firewall requests
- B3 : Wait for approval
- B3.1 : Allocate vLAN and create a maintenance window
- B4 : Schedule a maintenance window & notify users also support engg for backup
  - Route the traffic to secondary Cloud Native Function
- A4 : Upgrade the Cloud Native Function
- B4 : Perform health checks and route the traffic back to primary Cloud Native Function

504

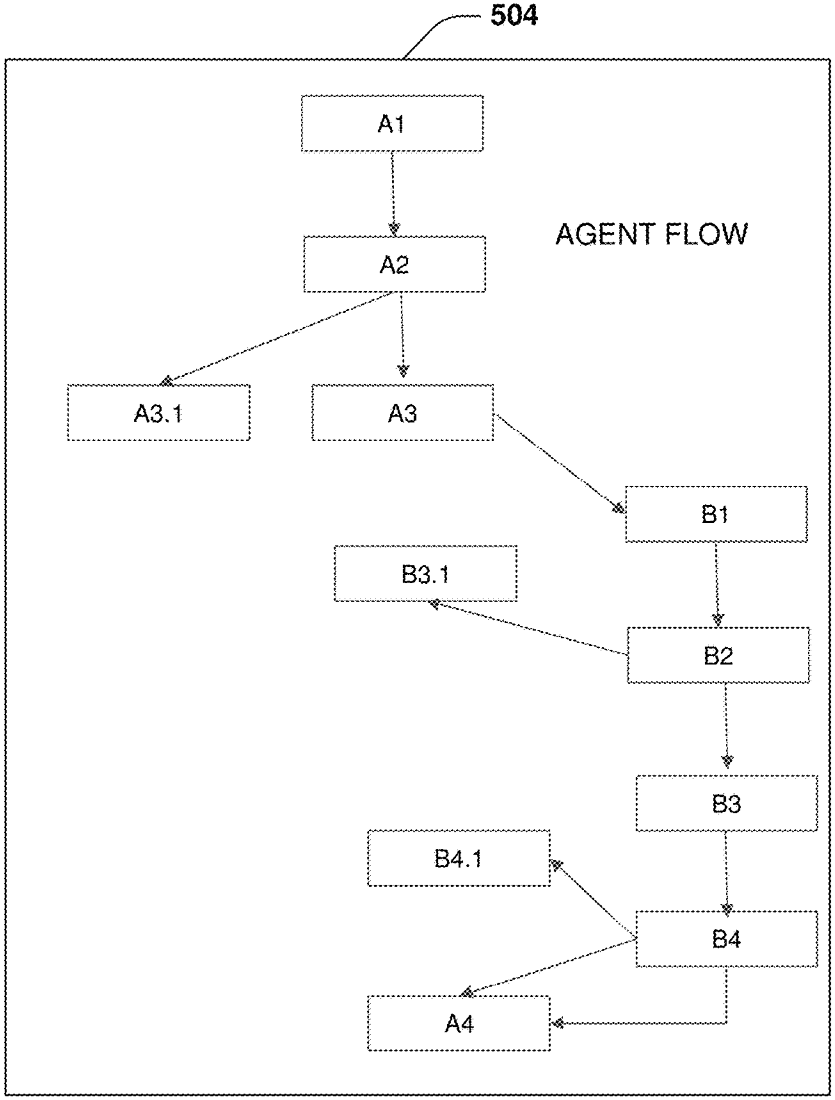

FIG. 5A

METHODS AND SYSTEMS FOR ARTIFICIAL INTELLIGENCE AGENT ORCHESTRATION AND SERVICE PROVISIONING THROUGH AGENTIC ARTIFICIAL INTELLIGENCE

BACKGROUND

Many services leverage artificial intelligence (AI) agents for performing various tasks. An AI agent may be implemented as a wrapper on top of a machine learning model. The AI agent may be configured to utilize the machine learning model to perform various tasks such as hosting a chatbot, automating tasks and workflows, fraud detection, data processing for identifying patterns and providing insights, decision making, and a wide variety of other tasks. AI agents may be configured to have specific skills required for specific tasks, and may be provided with access to knowledge bases, tools, and context and memory to remember conversations and imitate human type behavior.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5A is an illustration of example action plan and agent flow, in accordance with an embodiment of the present technology

DETAILED DESCRIPTION OF EXAMPLE EMBODIMENTS

Figure 1:
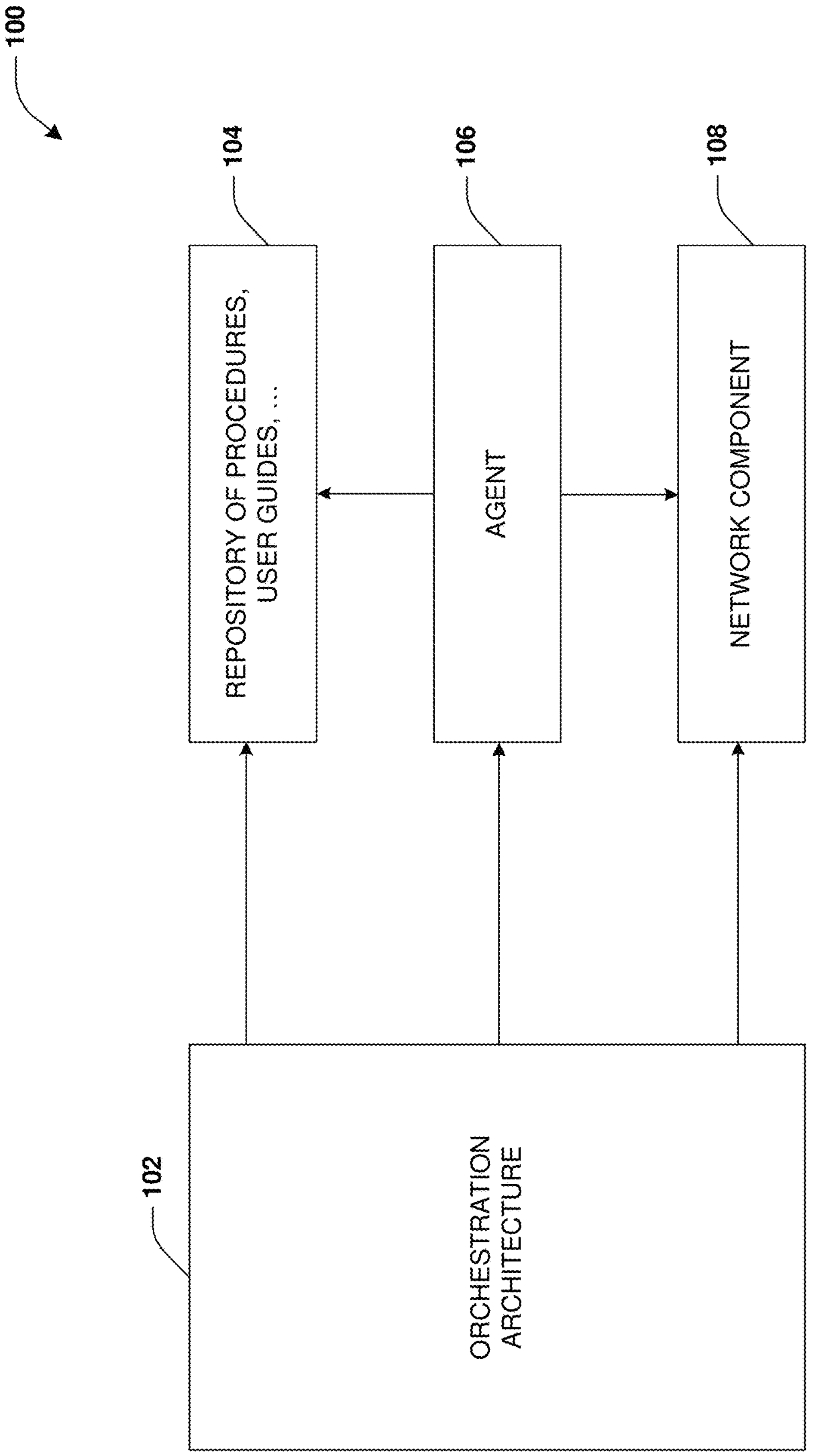
FIG. 1 illustrates an example of a system for orchestrating the deployment and operation of agents, in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

Systems and methods are provided for orchestrating the deployment and operation of agents. A computing environment includes various network components that may be associated with a network (e.g., a network provided by an operator). The network components provide user equipment with communication capabilities over the network. The network components may perform tasks (e.g., communication routing tasks, fraud detection tasks, load balancing tasks, network function tasks, etc.), host applications and services, provide cloud platform tools, etc. Network maintenance may be performed for the network components to upgrade the network components, configure the network components, modify operation of the network components, etc.

Network maintenance is disruptive for the user because network maintenance may cause service disruption, increased latency from rerouting requests to other network components, etc. Typical network maintenance involves many tedious tasks that are manually performed and can be error prone, which can result in the network maintenance taking longer than expected to complete. Human and process errors may include an established procedure of methods of procedure not being followed, a maintenance window not being scheduled, pre and post maintenance checks not being performed, using incorrect tools, implementing conflicting maintenance windows on the same or different devices that may affect an overall communication path, etc.

If an issue occurs, multiple teams may be involved in resolving the issue, which may prolong the service disruption to the user equipment. Network maintenance involves the performance of procedural steps such as method of procedures (MOPs). The time to complete the network maintenance can be reduced by leveraging artificial intelligence agents that utilize models for executing the procedural steps. The agents may utilize general models that may be publicly available, and thus the agents cannot easily leverage specific parameters of the network components and computing environment, such as site namespaces, IP addresses, virtual local area networks (VLANs), etc. Providing such parameters to the model can create security risks where the models could publicly expose such information. Furthermore, if a procedural step is modified or there is any deviation in the procedural steps being performed, then a significant amount of manual effort may be required for a developer to modify the automation code to add/modify the procedural step, test the modified automation code, and redeploy the tested automation code to production. This may be a tedious and long process because the modified automation code must be fully tested before being moved to production.

The disclosed techniques improve the efficiency of network maintenance by providing agent orchestration and management so that agents can quickly and efficiently perform the network maintenance. In particular, an orchestration architecture is provided to scan models leveraged by the agents, knowledge bases used by the agents, and the agents themselves, for vulnerabilities to ensure that the agents can correctly perform the network maintenance. The orchestration architecture deploys the agents, implements lifecycle management for the agents, manages and routes communication between the agents, logs and analyzes the agent to agent communication, monitors and replaces agents that violate operational limits specified by descriptors (e.g., exceeding resource limits, performing unexpected functionality, etc.), etc. The orchestration architecture constructs skill and context instructions defining how the agents are to interact with the network components. The orchestration architecture implements other functionality to manage the agents and improve the efficiency of performing the network maintenance. This may reduce or eliminates tedious and complex manual tasks, errors introduced during the manual tasks, and the time to perform the network maintenance, thus reducing user equipment disruption.

FIG. 1 illustrates an example of a system 100 for orchestrating the deployment and operation of agents. A computing environment may include various network components that provide services, such as communication services for user equipment connected to a communication network. The system 100 includes an orchestration architecture 102 that manages agents that are configured to perform tasks related to the network components, such as life cycle management, configuration management, maintenance tasks, and/or other types of network maintenance. The orchestration architecture 102 may determine that a task is to be performed for a network component 108. Accordingly, the task may be assigned to an agent 106 to perform. In some embodiments, an existing agent 106 may be deployed to perform the task (e.g. the agent 106 may be predefined as part of library of agents for deployment; the task may be assigned to existing agent; etc.). In some embodiments, the agent 106 may be dynamically generated and/or deployed on-demand based upon the determination that the task is to be performed, which conserves resources otherwise wasted in hosting idle agents. In this way, the agent is instructed to perform the task. The task may include a method of procedural steps. The agent may be hosted as a container, a virtual machine, an application, or a service, etc. The agent maybe configured to leverage a model such as a machine learning model that is capable of interpreting and performing the procedural steps.

The orchestration architecture 102 may generate and store information within a repository 104, such as a vector database or other type of knowledge base, accessible to the agent 106. The information may include the procedural steps (e.g., method of procedures for a service communication proxy, a network repository function, a policy control function, a subscriber location function, and/or other network functions of network components). The information may include user guides and/or API descriptions for the network components, such as for a tool that stores virtual network functions and/or cloud-native network functions, an orchestration platform (e.g., cloud orchestration), a service oriented platform, container orchestration such as Kubernetes, data analysis orchestration, etc.

The agent 106 may access the procedural steps, user guides, and API information within the repository 104 to learn how to interact with the network component 108 and perform the procedural steps upon the network component 108 as part of the network maintenance. The agent 106 may utilize the procedural steps, user guides, and API information as input into a model for interacting with the network component 108. In some embodiments, the agent 106 utilizes a trained model (e.g., a pre-trained foundation model) or a fine tuned model. The orchestration architecture 102 may generate skills, system or network prompts, and context instructions that include parameters for how the agent 106 is to execute the procedural steps for interacting with the network component 108. In some embodiments, the system or network prompts are used to configure the agent 106 with a persona (e.g., "you are a SCP agent you are expert in SCP MOPs, and configurations, etc.," "you are a NRF agent," "you are a K8s Agent, you know all K8s commands," "you are an ansible developer agent, you are expert in developing ansible scripts, etc.," "you are a document processing agent," etc.). The parameters may relate to operator's site specific information and configuration for the network component 108 such as IP address, site namespaces, whether the site is for core, edge, or other network location, deployment information, how to handle failures, how to track past failures, how to interact with the network component 108, a payload of the network component 108, how to open data having a certain format used by the network component 108, etc. In this way, the agent 106 may execute the procedural steps according to the skill and context instructions to perform the task as part of the network maintenance for the network component 108.

The orchestration architecture 102 may monitor execution of the agent 106 to determine whether the agent 106 violates any operational limits defined by a descriptor for the agent 106. The operational limits may relate to resource utilization limits (e.g., CPU, GPU, and storage limits), allowed communication (e.g., the agent 106 may communicate with other agents performing tasks associated with an action plan defined for the network maintenance), what services or information the agent 106 is allowed or not allowed to access, alerts or information the agent 106 is allowed or not allowed to output, anomalous or rogue behavior, hallucinations, etc. If the orchestration architecture 102 detects that the agent 106 has violated an operational limit, then the orchestration architecture 102 may terminate the agent 106 and perform a remedial action. The remedial action may relate to replacing the agent 106 with a new or existing agent, notifying a user to intervene for the task, deleting alerts and information generated by the agent 106, and/or undoing actions performed by the agent 106. In this way, the orchestration architecture 102 oversees the execution of tasks by agents for performing the network maintenance for network components.

In some embodiments, the orchestration architecture 102 may provide for a single agent and/or multi-agent collaboration. With a single agent, the agent is autonomous and is capable of making decisions within operator set limits via a descriptor. With multi agent collaboration, multiple agents collaborate on taking a decision. For example, if a slice needs to be added, then a vDU agent, a vCU agent, an SMF agent, a UPF agent, and an AMF agent will coordinate and add relevant slice configurations in their respective network functions to enable the slice. A similar situation may arise for a private network (e.g., a mobile private network) where an operator wants to create a service for client (e.g., an enterprise customer), so MPN configurations are added in corresponding network functions by corresponding agents through collaboration by the agents. The orchestration architecture 102 may utilize single agents for use cases, such as life cycle management and other maintenance tasks that do not impact other network functions or overall end to end network connectivity. The orchestration architecture 102 may utilize multiple agents for configuration management with multiple network functions, such as slicing and MPN. In this way, a single agent or a multi-agent configuration may be selected based upon a nature of the task to perform. In some embodiments, a team of agents may include a manager agent, a developer agent, a reviewer agent, an execution agent, and/or other types of agents. Each agent may be associated with network prompt templates, memory, skills (e.g., a skill associated with a network function), and/or knowledge base. The agents collaborate on making decisions.

Figure 2:
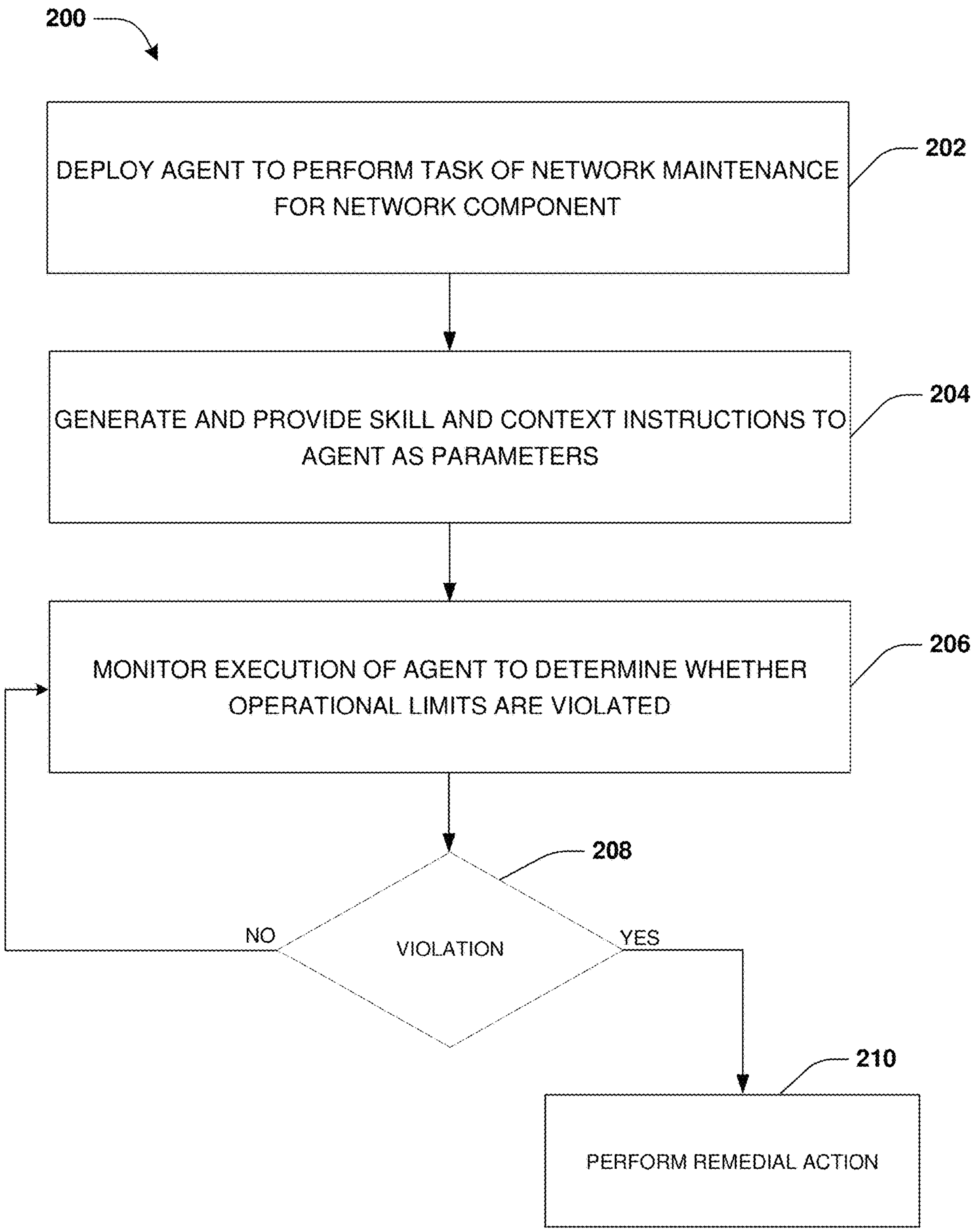
FIG. 2 illustrates an example of a method for orchestrating the deployment and operation of agents, in accordance with an embodiment of the present technology.
Figure 3A:
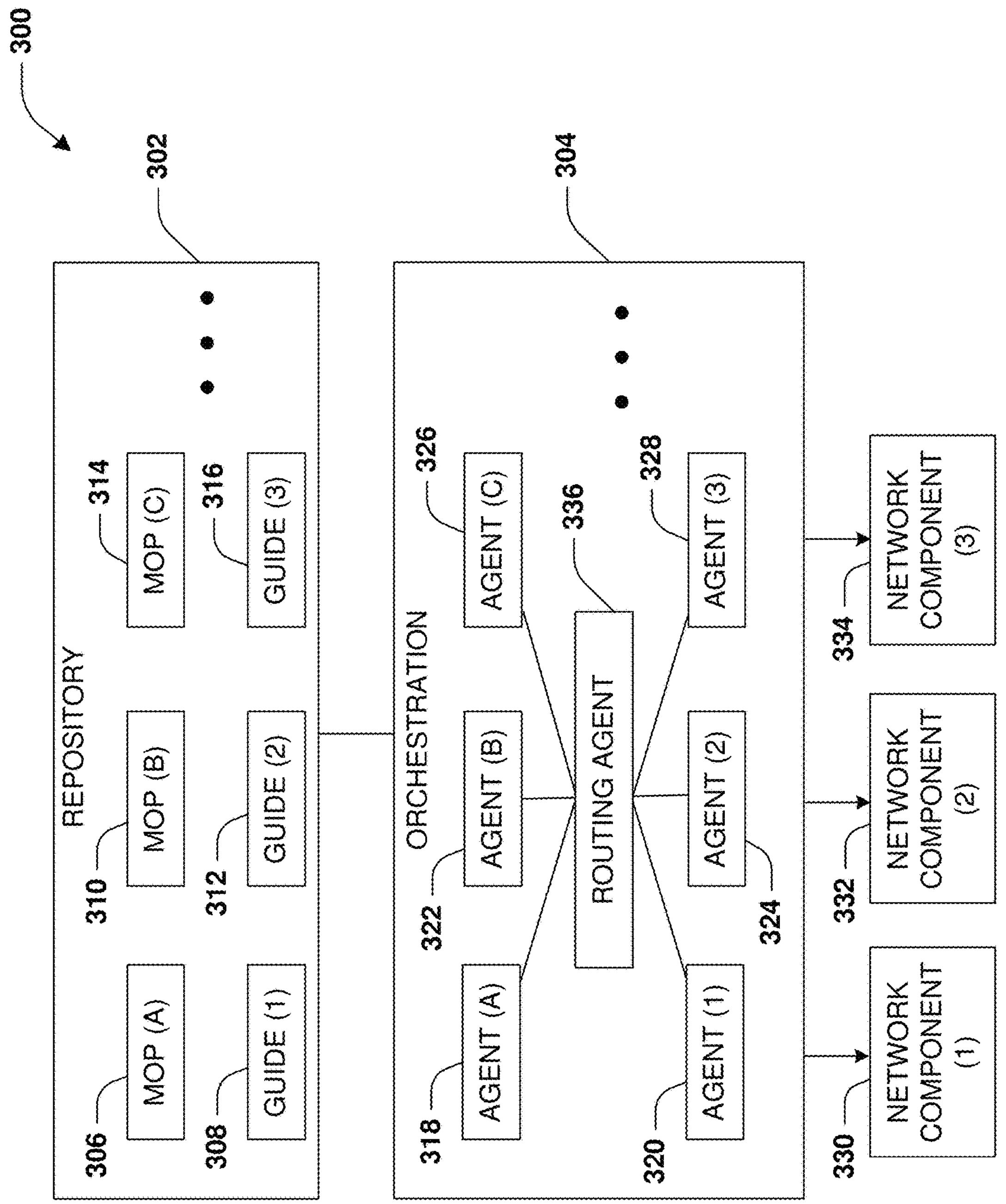
FIG. 3A illustrates an example of a system for orchestrating the deployment and operation of agents utilizing a first orchestration architecture configuration, in accordance with an embodiment of the present technology.
Figure 3B:
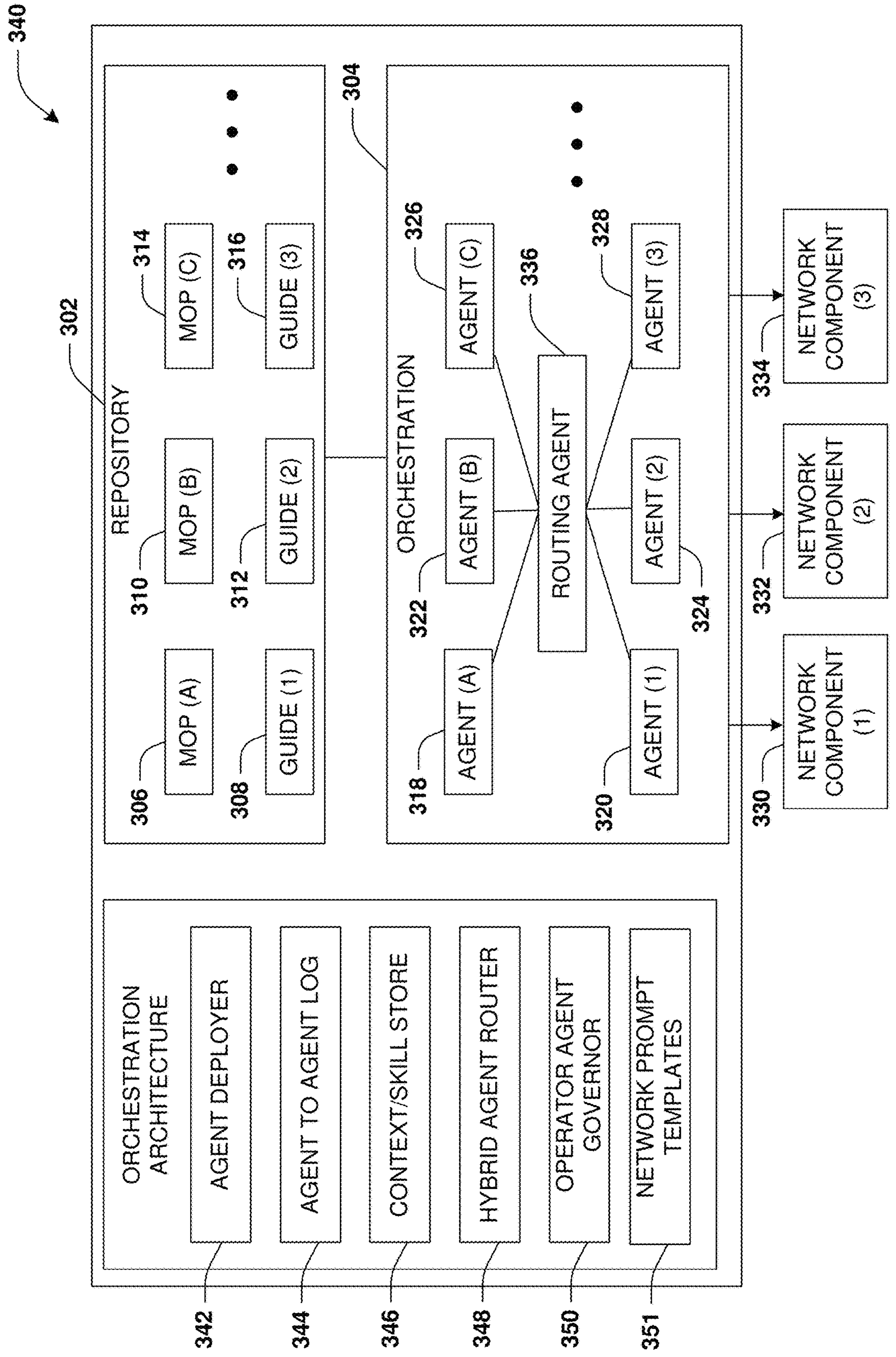
FIG. 3B illustrates an example of a system for orchestrating the deployment and operation of agents utilizing a second orchestration architecture configuration, in accordance with an embodiment of the present technology.
Figure 3C:
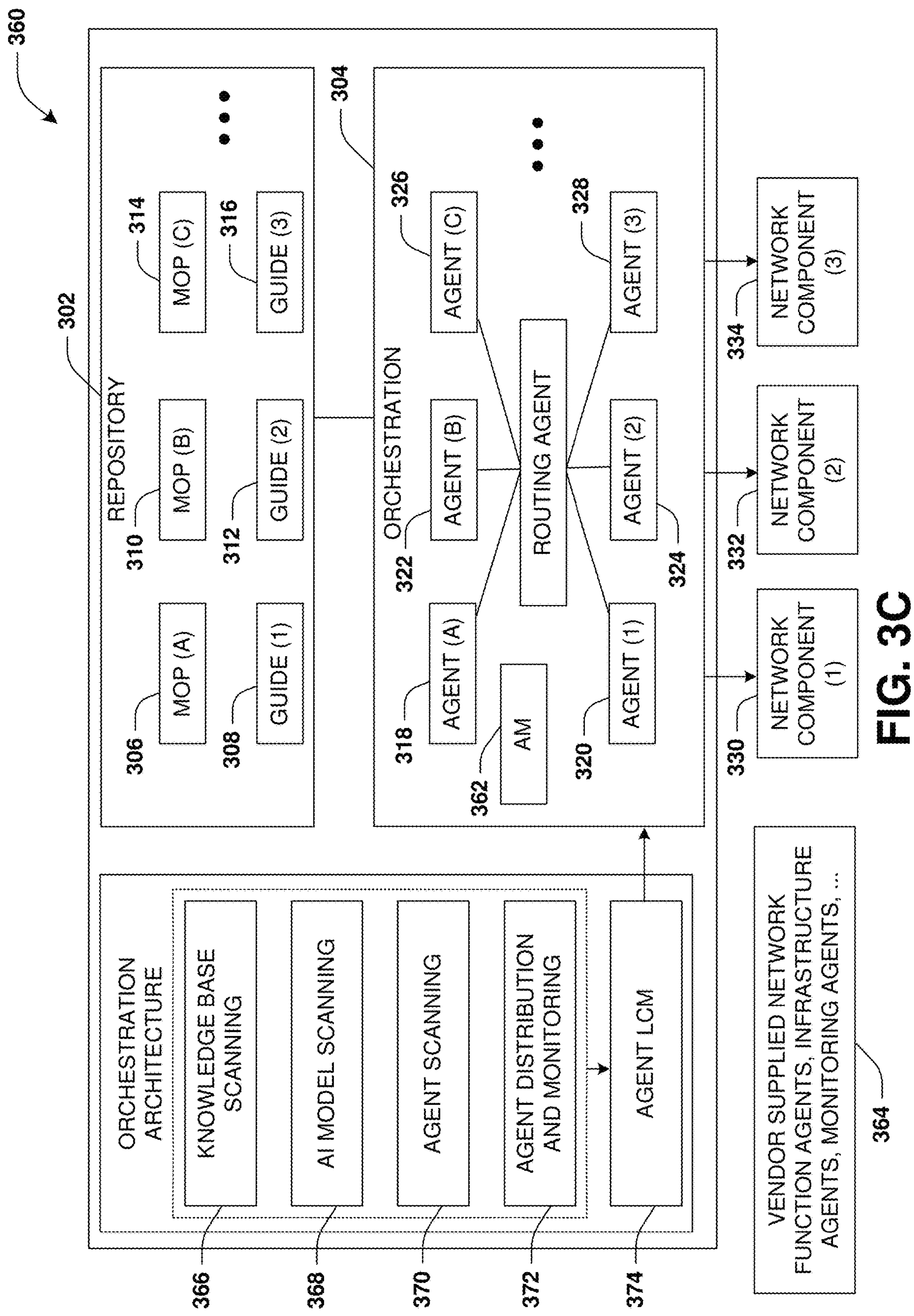
FIG. 3C illustrates an example of a system for orchestrating the deployment and operation of agents utilizing a third orchestration architecture configuration, in accordance with an embodiment of the present technology.

FIG. 2 illustrates an example of a method 200 for orchestrating the deployment and operation of agents, which is described in conjunction with system 300 of FIG. 3A, system 340 of FIG. 3B, and system 360 of FIG. 3C. A computing environment may host virtualized or cloud native network components, such as a first network component 330, a second network component 332, a third network component 334, and/or other network components associated with a communication network managed by an operator. The network components may provide storage services, communication routing services, security services, load balancing services, application hosting services, policy, session, access mobility, authentication, authorization, charging & data plane service, containerization, network functions, orchestration tools, cloud platform functionality, and/or a variety of other services for the computing environment. Network maintenance such as upgrades, troubleshooting, deployment, configuration management and/or adding, removing, or modifying functionality may be performed for the network components.

The network maintenance may be performed by executing procedural steps, such as method of procedures (MOPS). In some embodiments, the procedural steps include preparation tasks such as performing pre-checks for the network components, generating deployment artifacts, and/or creating a ticket for MW creation, fetching IPs configuring namespace with all the dependencies. The procedural steps may include execution tasks such as verifying primary network component status (e.g., ensuring that a primary network component being upgraded is ready for upgrade), routing traffic to a secondary network component (e.g., rerouting traffic from the primary network component to a different secondary network component while the primary network component is being upgraded), upgrading/reconfiguring/modifying the primary network component to perform the network maintenance, verifying health of the primary network component after network maintenance has been performed, rerouting traffic back from the secondary network component to the primary network component, and/or performing any rollback procedures if a failure occurred (e.g., transitioning the primary network component back to an original version before the upgrade/network maintenance). The procedural steps may include verification tasks such as generating notifications of whether the network maintenance was successful or not and/or troubleshooting of any failures.

In some embodiments, the procedural steps may include preparation tasks such as pushing an image to a network component, performing a unified service management (USM) upgrade, performing a virtualized centralized unit (vCU) upgrade, performing pre-checks for the vCU and a virtualized distributed unit (vDU), and/or generating batches (e.g., batches of modifications or updates to apply to network components). The procedural steps may include execution tasks such as initiating the batches, lazy loading of the batches, verifying key performance indicators (KPIs), correcting fallouts, including fallout vDU in a next batch, and/or performing any rollback procedures if a failure occurred. The procedural steps include verification tasks such as verifying the KPIs.

Performing the procedural steps manually can take days and results in significant disruption to user equipment. Any preventable human errors may cause an outage from hours to days till it is fixed. Accordingly, the system 300 includes an orchestration architecture that performs the method 200 capable of performing the network maintenance within hours or less instead of days. The orchestration architecture implements a repository 302 (e.g., a vector database or knowledge base) and orchestration 304 for performing network maintenance for the network components. The orchestration architecture may populate the repository 302 with procedure steps, such as method of procedure (A) 306, method of procedure (B) 310, and method of procedure (C) 314. The orchestration architecture may populate the repository 302 with user guides for the network components (e.g., documentation describing functionality, commands, operations, APIs, payloads, data formats, user inputs, etc.), such as a first user guide 308 for the first network component 330, a second user guide 312 for the second network component 332, and/or a third user guide 316 for the third network component 334. In some embodiments, information within the repository 302 may be used to train agents on how to interact with the network components for performing the network maintenance. In other embodiments, a model is leverage without additional training, and skills, network prompts, and/or knowledge base information is used by the agents to understands the MOPs and proceed without model training. A model may be pre-trained with skills, and thus system prompts and/or network prompts are provided to enable the skills, such as for the agent to act like a router expect or SCP expert.

The orchestration architecture may maintain or on-demand deploy agents to perform tasks as part of the orchestration 304 of the network maintenance, such as agent (A) 318 (e.g., an agent trained to perform the method of procedure (A) 306), agent (B) 322 (e.g., an agent trained to perform the method of procedure (B) 310), agent (C) 326 (e.g., an agent trained to perform the method of procedure (C) 314), agent (1) 320 (e.g., an agent trained to interact with the first network component 330), agent (2) 324 (e.g., an agent trained to interact with the second network component 332), and agent (3) 328 (e.g., an agent trained to interact with the third network component 334). If an agent is received from a vendor, then the agent may be a trained agent for certain network function installation procedures where MOPs are not required. If an operator builds an agent, then prompting and setting a context with background and expectations is used. Accordingly, during operation 202 of method 200, an agent is deployed as part of the orchestration 304 to perform a task of the network maintenance for a network component. The agent may utilize a model to understand and implement procedural steps for performing the task of the network maintenance. The agent may be provided with access to methods of procedures, user guides, and/or network site details for the network component such as site namespaces, IP address, whether the site is for core, edge, or other network location, deployment information, how to handle failures, how to track past failures, how to interact with the network component, a payload of the network component, how to interact with other agents that represent other network elements, how to open data having a certain format used by the network component, etc. In some embodiments, multi-agent collaboration of multiple agents is used for certain use cases such as creating a slice or service that could span multiple network functions in RAN, Core, etc.

During operation 204 of method 200, skill, network prompts and context instructions are generated and provided to the agent as parameters. The parameters define the persona of the agent how the agent is to execute the procedural steps for interacting with the network component as part of performing the task. In some embodiments, the skill and context instructions include an API description (e.g., an API endpoint, inputs for the API, outputs returned by the API, etc.). In some embodiments, the skill and context instructions include a format supported by the network component and/or how to interpret the format (e.g., a format used to structure data that is input into or output from the network component). In some embodiments, the skill and context instructions include failure handling instructions and/or instructions for how to track whether the network component has failed or previously failed. In some embodiments, if the agents have skills to analyze logs, then the agents can identify root cause analysis if any, and if permitted by the descriptor agent, then auto remediation and/or rollback may be performed. In some embodiments, the skill and context instructions include operational information for the network component (e.g., inputs, outputs, functions performed by the network component, expected operation of the network component, expected resource utilization, how the network component interacts with user equipment or other devices connected to the communication network, ETSI skills, 3GPP skills etc.). In some embodiments, the skill and context instructions include payloads expected by the network component. In some embodiments, the skill and context instructions include tool navigation instructions for the network component such as how to access certain commands, functions, and/or data of the network component. In this way, the agent is deployed for performing the task of the network maintenance (e.g., openstack, openshift skills, router configuration skills, network element specific skills, etc.)

In some embodiments, a descriptor is defined with operational limits for the agent such that if an operational limit is violated, then the agent is terminated and/or a remedial action is performed. The descriptor may define resource utilization limits for the agent, such as CPU limits, GPU limits, storage limits, and/or other resource limits. In some embodiments, the descriptor may specify allowed/expected agent behavior and operation (e.g., the agent may be allowed to perform functionality related to a task assigned to the agent, but is restricted from performing other functionality such as deleting configurations or from accessing sensitive data, services, or devices not related to performing the task if required then agent should take approval from human operator or create a ticket). In some embodiments, the descriptor may specify access boundaries of what services, data, devices, and/or information that the agent is allowed to access. In some embodiments, the descriptor may specify a number of agents permitted to create an action plan of tasks to implement for executing the network maintenance. In some embodiments, the descriptor may specify conditions for shutting down an agent. In some embodiments, the descriptor may specify permitted and restricted agent deployment locations (e.g., deployment within the cloud, on-premise, a particular computing device, a particular geographical region, within a virtual machine, within a container, etc.). In some embodiments, the descriptor may specify permitted alerts and alert types that the agent can generate. In some embodiments, the descriptor may specify approved models such as artificial intelligence (AI) and machine learning (ML) models that the agent can utilize.

During operation 206 of method 200, execution of the agent is monitored to determine whether any operational limits defined by the descriptor are violated. During operation 208 of method 200, a determination is made as to whether an operational limit has been violated. If no operational limits are violated, then monitoring of the execution of the agent is continued. If an operational limit is violated, then the agent is terminated and a remedial action is performed, during operation 210 of method 200. In some embodiments, the remedial action is performed to replace the agent with an existing agent (e.g., an existing agent having a high availability relationship with the agent being replaced). In some embodiments, the remedial action is performed to replace the agent with a newly constructed and deployed agent. In some embodiments, the remedial action is performed to notify a user to intervene for performing the task. In some embodiments, the remedial action is performed to delete alerts and/or information generated by the agent such as where the agent went rogue and/or performed erroneous/unexpected actions such as due to hallucinating (e.g., incorrectly performing the task).

In some embodiments, a plurality of agents may be deployed as part of performing the network maintenance for a plurality of network components. In some embodiments, the plurality of agents may be defined as a team of agents based upon a criteria. The criteria may specify a minimum number of agents, a maximum number of agency, redundancy (e.g., an agent is to have at least one or more partner agents that can take over for the agent if the agent is terminated), resource limits (e.g., CPU, GPU, and/or storage resource limits), and/or allowed models that the agents can use. The criteria may specify allowed subnets that the agents can create, a team theory for the agents (e.g., Belbin, TuckMan's, HackMans, etc.), a consensus theory for the agents (e.g., Paxos, Raft, BFD, PoS, Max Paxos, etc.), allowed admin operations (e.g., what actions an admin is allowed to perform as part of the network maintenance), a human review option (e.g., whether a human is to review a result of an agent performing a task), etc. The criteria may specify a load balancer agent option where an agent is tasked with balancing that load amongst other agents, a firewall agent option where an agent is designated to implement firewall protection, an auditor agent option where an agent is designated to audit operation of the agents to determine whether the agents are operating correctly, etc.

An action plan may be generated for the agents to execute. The action plan may define a sequence of tasks assigned to the agents to execute according to a defined order. FIG. 5A illustrates an embodiment of an action plan 502 where an agent (A1), an agent (A2), an agent (A3), an agent (A4), an agent (B1), an agent (B2), an agent (B3), and an agent (B4)

perform various tasks such as checking network components for deliveries, script availability, correct topology, and/or dependencies. The tasks may include obtaining IPs for deployment, creating firewall requests, waiting for approval, allocating a vLAN and creating a maintenance window, scheduling the maintenance window, also validating if there are any conflicting maintenance window requests for same or other network element that affects the service and notifying users about support. The task may include routing traffic to a different network component (e.g., a secondary cloud native function partnered with the network component being upgraded), upgrading the network component (e.g., upgrading a primary cloud native function), performing health checks, and/or routing traffic back to the network component such as the primary cloud native function after upgrade.

The agents may perform the tasks according a defined order of an agent flow 504 that describes how completion of a task by one agent may trigger execution of a next task by another agent (e.g., completion of a task by agent (A1) triggers execution of a task by agent (A2), and completion of the task by agent (A2) triggers execution of tasks by agent (A3), etc.). In some embodiments, the agent flow 504 is represented as a dependency graph representing the agents, roles defined for the agents, responsibilities (tasks) assigned to the agents, and/or the defined order for the sequence of tasks.

In some embodiments, monitoring is performed such as by the team of agents to determine whether a consensus trigger situation is detected (e.g., a situation where an action is to be performed, an action plan is to be created, an agent is to be terminated, a new agent is to be added, a task is to be aborted, etc.). In response to detecting the consensus trigger situation, a consensus algorithm (a consensus theory) is executed amongst the agents to determine how to resolve the consensus trigger situation.

In some embodiments, a routing agent 336 is implemented to facilitate communication amongst the agents. The routing agent 336 may facilitate communication between the agents and the network components. The routing agent 336 may facilitate communication between the agents and the repository 302. The agents may register to routing agent 336, and routing agent 336 has information about all the agents. If agent 1 wants to talk to agent 2, then agent 1 will reach out to routing agent 336 and ask for how to navigate to agent 2. Agent 336 provides details about agent 2 so that agent 1 can communicate with agent 2. If agent 2 is unavailable, then routing agent 336 will provide another similar function agent 2.1 (standby or backup) to agent 1 to communicate with.

Figure 5B:
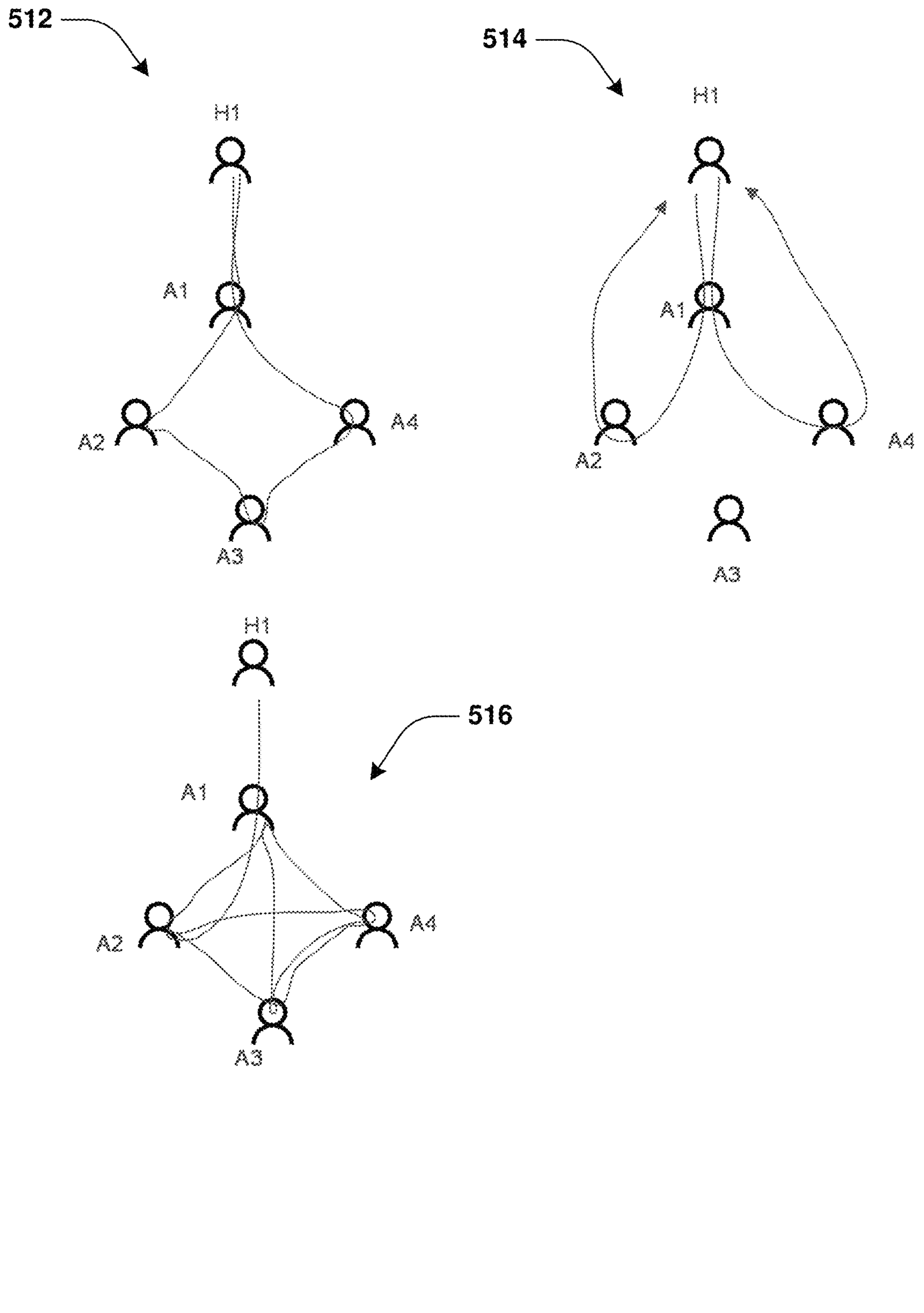
FIG. 5B is an illustration of example agent teams, in accordance with an embodiment of the present technology

An agent communication scheme may be defined how the agents may communicate amongst one another. FIG. 5B illustrates a first agent communication scheme 512, a second agent communication scheme 514, and a third agent communication scheme 516 corresponding to different possibilities on how different agents can communicate amongst each other leveraging different algorithms. The agent communication schemes represent agents (A1), (A2), (A3), and (A4), and a human user (H1). The lines between the representations of the agents and human user represent permissible communication. For example, the first agent communication scheme 512 may allow the human user (H1) to communicate with the agent (A1), the agent (A1) is allowed to communicate with the agent (A2) and the agent (A4), and the agent (A3) is allowed to communicate with the agent (A2) and the agent (A4). The second agent communication scheme 514 specifics directional based communication where the human user (H1) can communicate with the agent (A1), the agent (A1) is allowed to communicate with the agent (A2) and the agent (A4), and the agent (A2) and the agent (A4) are allowed to communicate back to the human user (H1), while the agent (A3) is not allowed to communicate with other agents and the human user (H1). A team manager, such as agent (A1) may be designated for facilitating the communication amongst the agents, and may be responsible for receiving communication from the human user (H1). In some embodiments, network policies are created, deleted, and/or modified based upon rules defined for agent communication.

In some embodiments, the orchestration architecture may scan the agents, models used by the agents, and/or knowledge bases used by the agents. The scan may be performed to detect vulnerabilities (e.g., security vulnerabilities, an agent going rogue and operating erroneously, an agent hallucinating and failing to correctly perform tasks, etc.). In response to detecting a vulnerability, the remedial action may be performed such as to generate an alert of the vulnerability, terminate the agent, block access to a knowledge base, restrict agents from using a model, etc.

In some embodiments, the orchestration architecture may authenticate new models for use by the agents (e.g., a vendor may provide an operator of a communicate network with the agents, models, and/or knowledge bases that are managed and orchestrated by the orchestration architecture implemented by the operator). If the new model is not successfully authenticated, then the new model is not deployed to the repository and/or agents are restricted from utilizing the new model. If the new model is authenticated, then a transport, a platform, and/or an application are configured for access by the new model (e.g., the new model may be deployed for access by agents of the orchestration architecture/platform).

FIG. 3A illustrates a first orchestration architecture configuration for the orchestration architecture implementing the method 200, such as where agents are statically deployed and maintained as available for performing network maintenance. FIG. 3B illustrates a system 340 with a second orchestration architecture configuration for the orchestration architecture implementing the method 200, such as where agents may be dynamically deployed and orchestrated by various components hosted by the orchestration architecture. For example, an agent deployer 342 is configured to deploy agents on-demand based upon tasks that need to be performed. An agent to agent log 344 is implemented to log communication between the agents. The communication may be evaluated to determine whether the agents are violating any operational limits specified by the descriptor, such as sending or requesting data that the agents should not be generating, accessing, or receiving, executing functionality or requesting the execution of functionality that an agent should not be executing or requesting, etc. A context/skill store 346 is implemented to store the skill and context instructions that are generated for agents to define how the agents are to interact with network components. A hybrid agent router 348 is implemented for routing communication amongst the agents and/or between agents and the repository 302 and the network components. An operator agent governor 350 is implemented for monitoring agents to detect whether the agents are violating any operational limits specified by the descriptor (e.g., whether an agent is malfunctioning or unintentionally performing actions or hallucinating). Accordingly, the operator agent governor 350 may terminate and/or perform remedial actions based upon any violations.

FIG. 3C illustrates a system 360 with a third orchestration architecture configuration for the orchestration architecture implementing the method 200, such as where agents 364 are supplied by a source external to the orchestration architecture. For example, the agents 364 may be supplied by a vendor of the operator of the communication network for which the orchestration architecture is implemented. The agents 364 may include network function agents, infrastructure agents, security audit agents, monitoring agents, and/or other agents that may be hosted by the orchestration architecture. The orchestration architecture may implement an agent LCM 374 that performs various scans to detect vulnerabilities such as where an agent fails to operate as expected. The scans may include knowledge base scanning 366, model scanning 368, network prompt templates scanning (e.g., network prompt templates 351), and/or agent scanning 370 that may be performed during deployment. The scans may include ongoing agent distribution and monitoring 372 to monitor the agents during operation, such as to detect real-time operational issues, failures, and rogue behavior so remedial actions can be performed. The agent LCM 374 may communicate with an agentic moderator 362 hosted as part of the orchestration 304 of the agents. The agentic moderator 362 is configured to monitor the interaction between agents so that if an agent is performing bad actions (e.g., the agent goes rogue and is not operating as expected), then the agent is shut down and/or alerts causing a threshold amount of notifications may be deleted. The agentic moderator 362 may notify a human operator of the situation. The models being used by the rogue agent are further analyzed to identify any vulnerabilities and/or causes of the undesirable behavior in neural networks of the models. The agentic moderator 362 enforces resource limits on agents, authenticates, authorizes new models, and/or creates, modifies, or deletes network policies on-demand based upon predefined rules.

The orchestration architecture improves the efficiency of various tasks and operations that would otherwise be manually intensive, time consuming, and error prone. For example, AI workflows to analyze MOPs may be reduced from 3 days to 1 day, agentic AI associated with MOP to code generation and test automation may be reduced from 4 weeks to 3 days, assistive AI for MTCE orchestration certification may be reduced from 1 week to 3 days, and assistive AI associated with code execution (LCM) may have significantly reduced manual effort or assistance. The orchestration architecture may employ various types of AI agents to perform such tasks and operations, such as a MOP agent, an automation agent, and/or an execution agent.

Figure 4A:
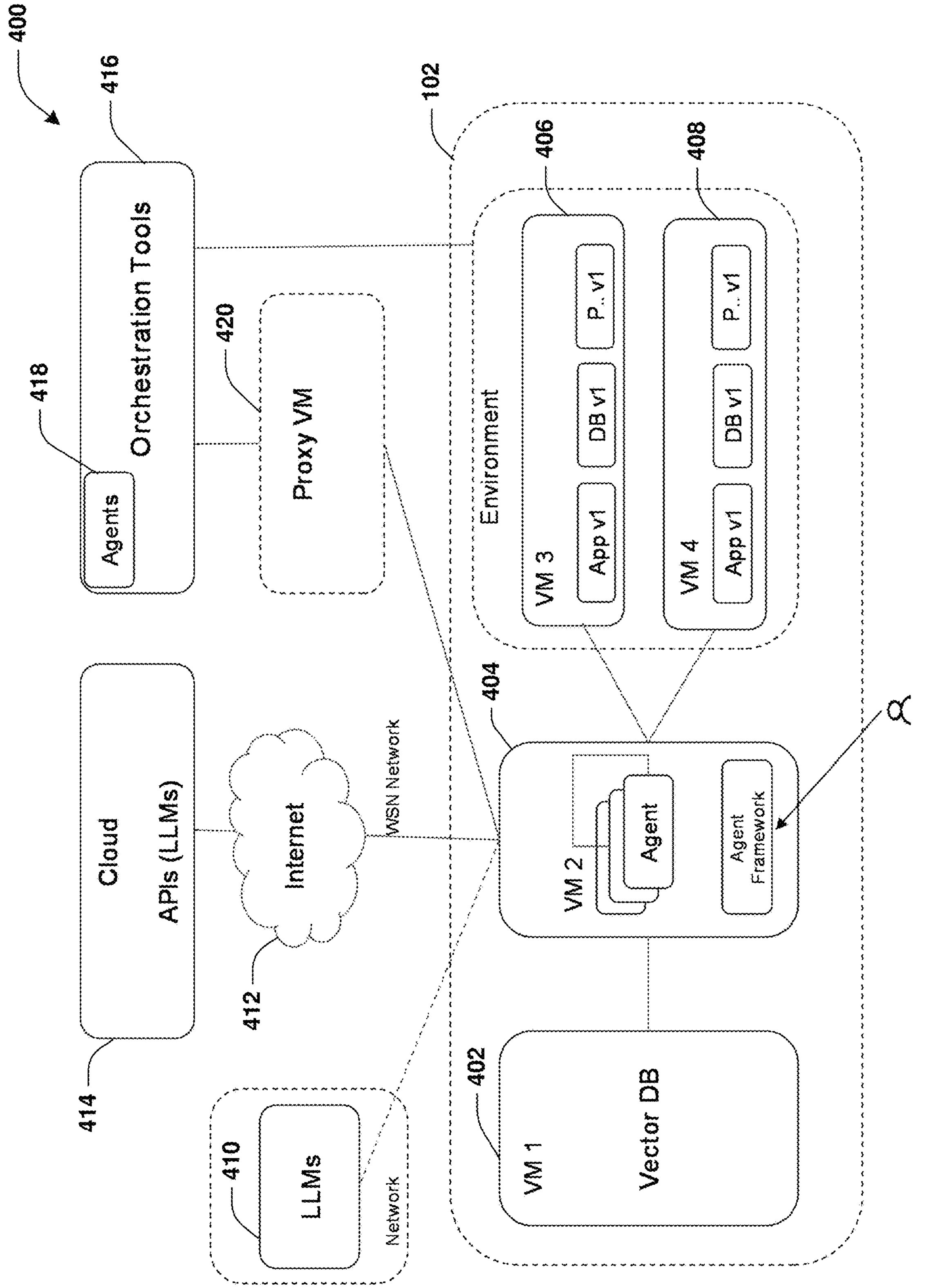
FIG. 4A illustrates an example of a system for orchestrating the deployment and operation of agents, in accordance with an embodiment of the present technology.

FIG. 4A illustrates an example of a system 400 for orchestrating the deployment and operation of agents. The system 400 may include the orchestration architecture 102 that may execute the method 200. The orchestration architecture 102 may host the repository 104 as a vector database within a first virtual machine 402. The orchestration architecture 102 may hosted agents and/or an agent framework within a second virtual machine 404. The agent framework may be implemented to perform the method 200 for orchestrating the deployment and operation of agents. The agents may be provided with access to network components hosted within an environment, such as applications, databases, and/or platforms hosted within a third virtual machine 406 and a fourth virtual machine 408. In some embodiments, the agents may leverage models 410 (e.g., large language models) that are accessible over a local network. In some embodiments, the agents may leverage models hosted by a cloud computing environment 414 accessible over the internet 412 using APIs. In some embodiments, agents 418 may be hosted by orchestration tools 416, and are accessible to the orchestration architecture 102 through a proxy virtual machine 420. In this way, the orchestration architecture 102 may orchestrate the deployment and operation of agents.

Figure 4B:
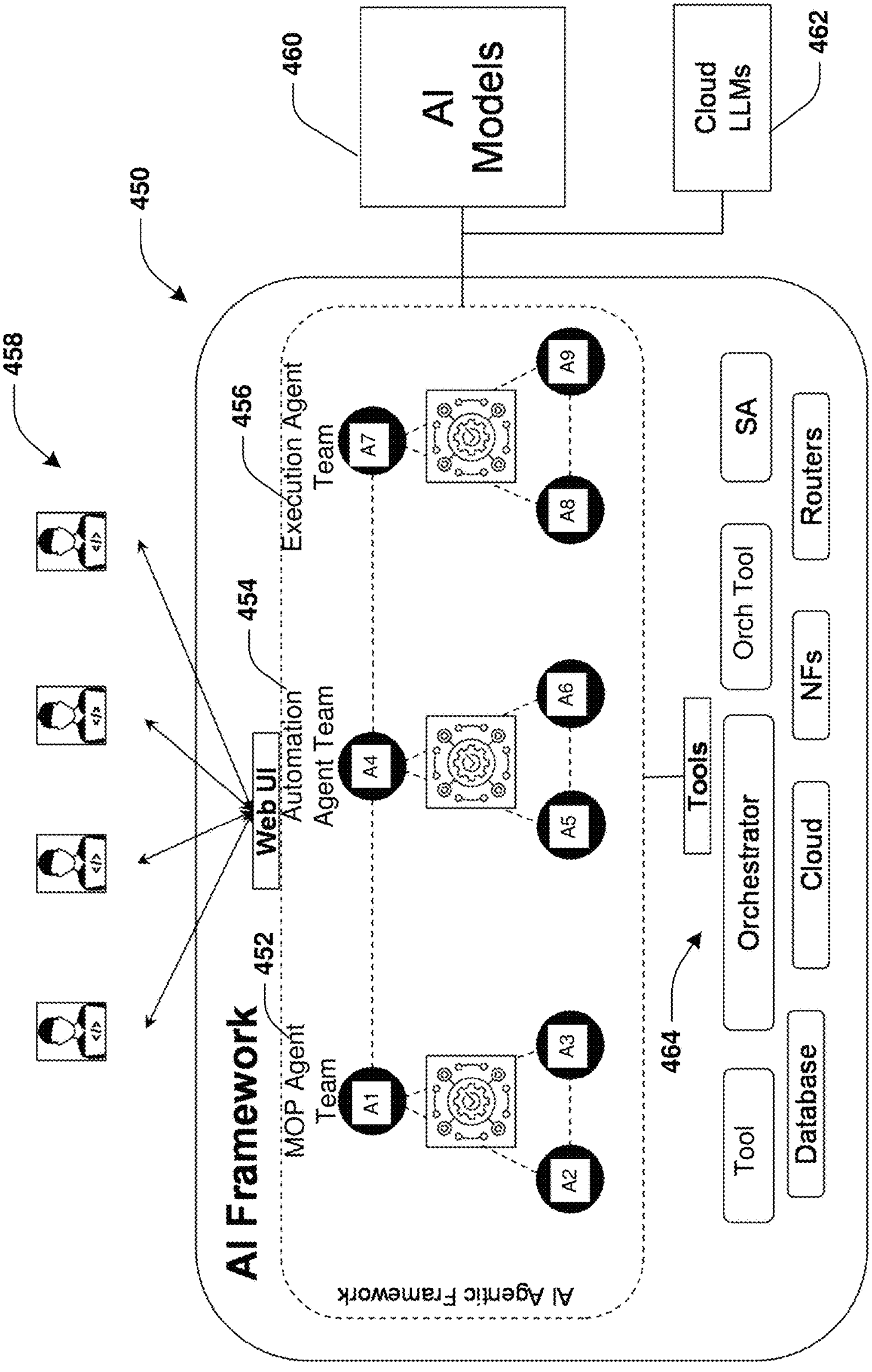
FIG. 4B illustrates an example of an AI framework of agents, in accordance with an embodiment of the present technology.

FIG. 4B illustrates an example of an AI framework 450 of agents, such as a MOP agent team 452, an automation agent team 454, and execution agent team 456, and/or other agents that may be part of an AI agentic framework (e.g., an assurance agent team, a configuration agent team, a security audit agent team, a 5G slice agent team, an MPN agent team, a network analytics agent team, etc.). The agent teams may include any number of AI agents (AI assistants) such as A1, A2, A3, etc. Users 458 may access the AI framework 450 through a web user interface or any other interface. The agents may have access to AI models 460 and/or cloud LLMs 462, which may be located in virtual private clouds or public clouds based upon data sensitivity. In some embodiments, the agents may be mapped to multiple LLMs based on capabilities. The agents may utilize tools 464 for performing tasks related to a VNFMP tool that stores virtual network functions and/or cloud-native network functions, an orchestrator, databases, an operator cloud, network functions (NFs), routers, orchestration tools, etc. The MOP agent team 452 processes network function installation MOPs. The automation agent team 454 develops code from text (e.g., from MOP). The execution agent team 456 executes the code. Other agent teams may be implemented such as a root cause analysis agent in the event of detected failures, a configuration audit agent, etc. The agents and/or agent teams may perform non-maintenance window tasks.

In some embodiments, the disclosed methods such as method 200 and/or the disclosed systems such as system 100, system 300, system 340, system 360, and/or system 400 may be implemented for the methods, systems, and/or techniques described by U.S. patent application Ser. No. 18/906,614, filed on Oct. 4, 2024, the entirety of which is incorporated by herein by reference.

Figure 6:
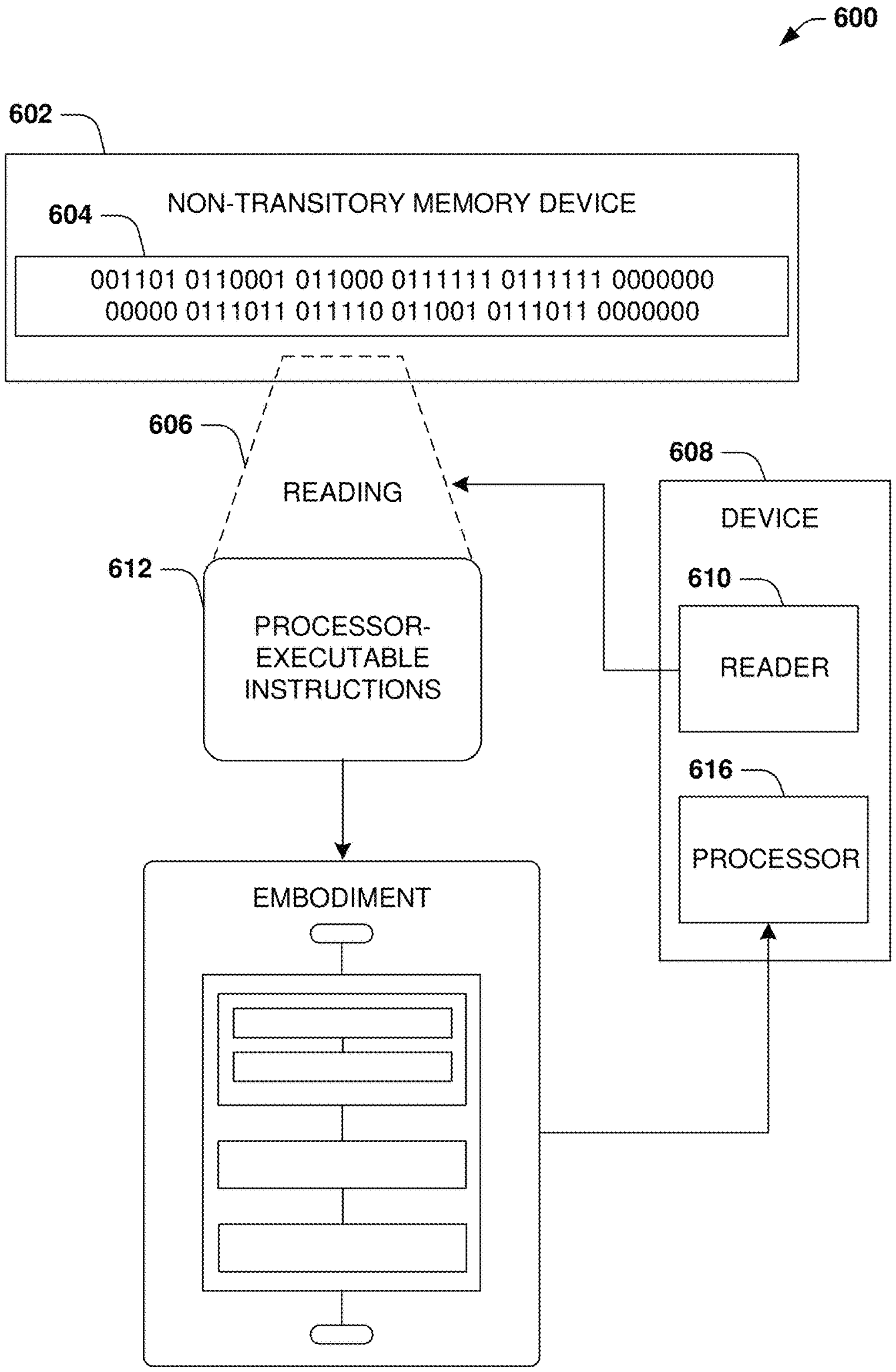
FIG. 6 is an illustration of example networks that may utilize and/or implement at least a portion of the techniques presented herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of the example system 300 of FIG. 3A, at least some of the example system 340 of FIG. 3B, at least some of the example system 360 of FIG. 3C, and/or at least some of the example system 400 of FIG. 4A, for example.

Figure 7:
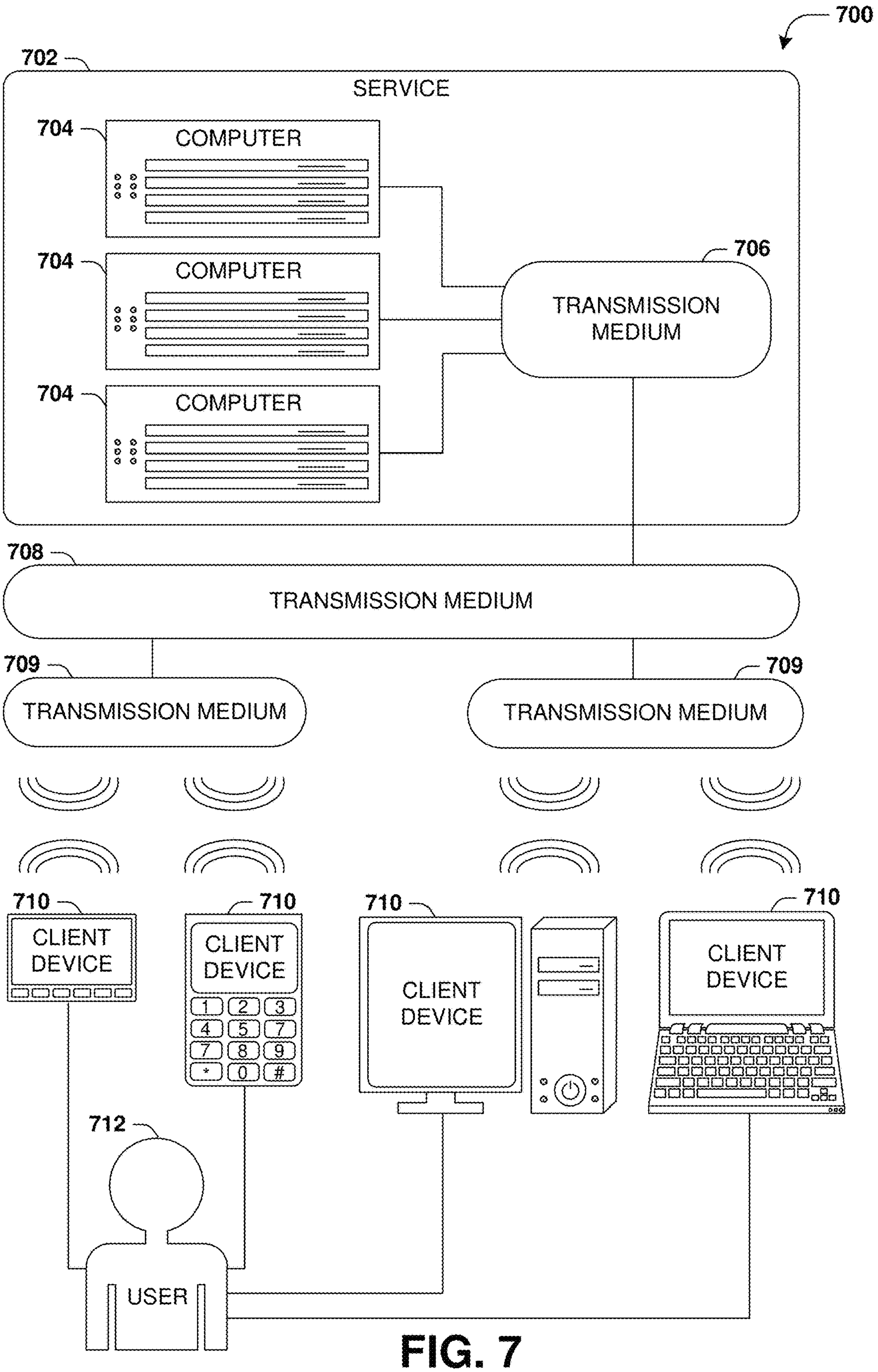
FIG. 7 is an illustration of a scenario involving an example configuration of a computer that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

In some embodiments, the computers 704 may be host devices and/or the client device 710 may be devices attempting to communicate with the computer 704 over buses for which device authentication for bus communication is implemented.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 709 provided by a cellular provider. As a second such example, one or more client devices 710 may communicate with the service 702 by connecting to the transmission medium 708 via a transmission medium 709 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the computers 704 and the client devices 710 may communicate over various types of transmission mediums.

Figure 8:
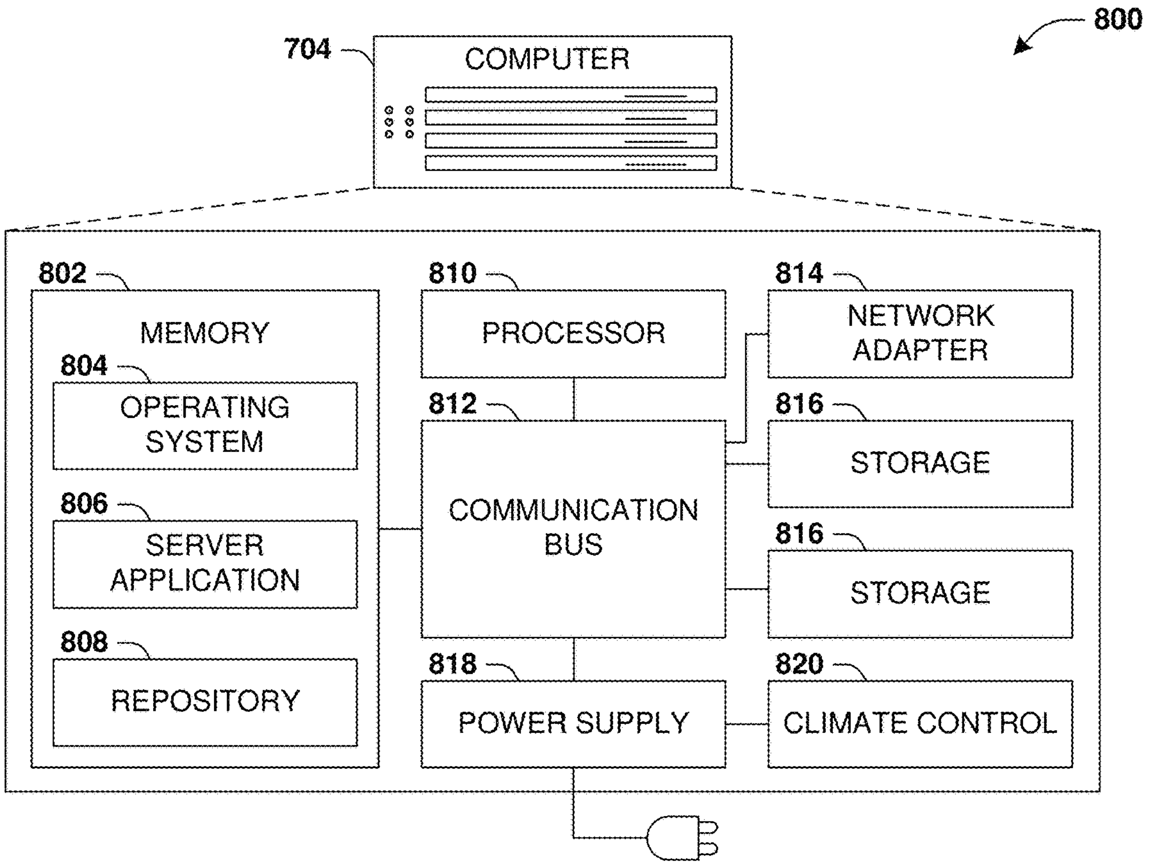
FIG. 8 is an illustration of a scenario involving an example configuration of a client that may utilize and/or implement at least a portion of the techniques presented herein.

FIG. 8 presents a schematic architecture diagram 800 of a computer 804 that may utilize at least a portion of the techniques provided herein. Such a computer 804 may vary widely in configuration or capabilities, alone or in conjunction with other computers, in order to provide a service.

The computer 804 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 804 may comprise memory 802 storing various forms of applications, such as an operating system 804; one or more computer applications 806; and/or various forms of data, such as a database 808 or a file system. The computer 804 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 804 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 804 with at least one other computer. Other components that may optionally be included with the computer 804 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 818 that supplies and/or regulates power for the other components. The computer 804 may provide power to and/or receive power from another computer and/or other devices. The computer 804 may comprise a shared and/or dedicated climate control unit 820 that regulates climate properties, such as temperature, humidity, and/or airflow. Many such computers 804 may be configured and/or adapted to utilize at least a portion of the techniques presented herein.

Figure 9:
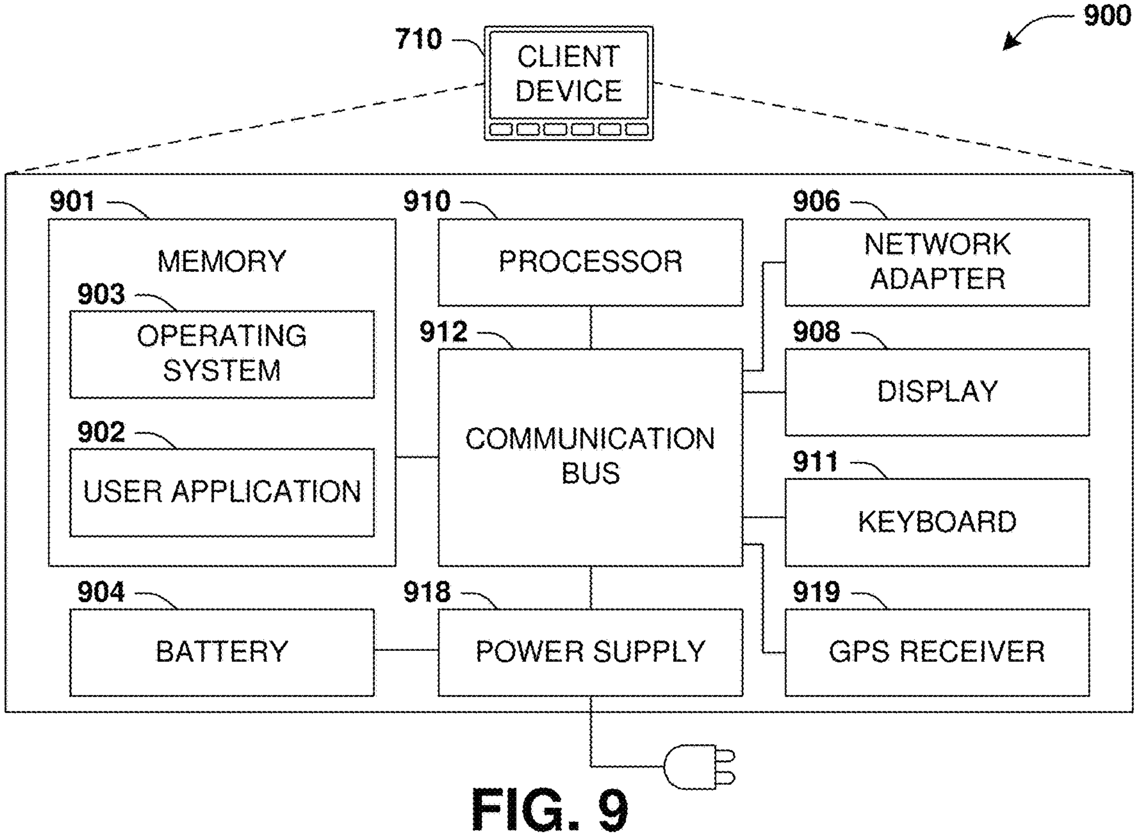
FIG. 9 is an illustration of a scenario featuring an example non-transitory machine readable medium in accordance with one or more of the provisions set forth herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure.

In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:

deploying an agent to perform a task as part of network maintenance for a network component, wherein the agent utilizes a model to execute procedural steps for performing the network maintenance;

generating and providing skill and context instructions to the agent as parameters defining how the agent is to execute the procedural steps for interacting with the network component;

monitoring execution of the agent according to the skill and context instructions to determine whether operational limits, defined by a descriptor for the agent, are violated; and in response to the agent violating the operational limits, terminating the agent and performing a remedial action.

2. The method of claim 1, wherein:

performing the remedial action comprises at least one of replacing the agent with an existing agent, creating a new agent to replace the agent, notifying a user to intervene for the task, or deleting alerts and information generated by the agent.

3. The method of claim 1, comprising:

deploying a plurality of agents as part of performing the network maintenance for a plurality of network components that include the network component, wherein the plurality of agents includes the agent; and generating an action plan defining a sequence of tasks assigned to the plurality of agents to perform according to a defined order.

4. The method of claim 3, further comprising:

generating a dependency graph representing the plurality of agents, roles defined for the plurality of agents, and responsibilities assigned to the plurality of agents.

5. The method of claim 3, further comprising:

in response to detecting a consensus trigger situation, executing a consensus algorithm amongst the plurality of agents to determine how to resolve the consensus trigger situation.

6. The method of claim 1, further comprising:

deploying a plurality of agents as part of performing the network maintenance for a plurality of network components that include the network component, wherein the plurality of agents includes the agent; and implementing a routing agent to facilitate communication amongst the plurality of agents, communication between the plurality of agents and the plurality of network components, and communication between the plurality of agents and a repository storing the procedural steps.

7. The method of claim 1, further comprising:

selecting a single agent or a multi-agent configuration based upon a nature of the task to perform.

8. The method of claim 1, further comprising:

training or tuning the model based upon at least one of a knowledge base, network prompt skills, or persona parameters.

9. A system, comprising:

one or more processors configured for executing instructions to perform operations comprising:

deploying an agent to perform a task as part of network maintenance for a network component, wherein the agent utilizes a model to execute procedural steps for performing the network maintenance;

generating and providing skill, network prompts and context instructions to the agent as parameters defining how the agent is to execute the procedural steps for interacting with the network component;

monitoring execution of the agent according to the skill and context instructions to determine whether operational limits, defined by a descriptor for the agent, are violated; and in response to the agent violating the operational limits, terminating the agent and performing a remedial action.

10. The system of claim 9, wherein the operations further comprise:

defining the descriptor to specify at least one of resource utilization limits, allowed agent behavior and operation, access boundaries, a number of agents permitted to create an action plan, conditions for shutting down agents, permitted and restricted agent deployment locations, permitted alerts and alert types, or approved models available for agents.

11. The system of claim 9, wherein the operations further comprise:

terminating the agent based upon the agent exceeding resource limits specified by the operational limits.

12. The system of claim 9, wherein the operations further comprise:

scanning the agent, the model, and a knowledge base used by the agent; and in response to the scanning identifying a vulnerability, performing the remedial action.

13. The system of claim 9, wherein the operations further comprise:

authenticating a new model for utilization by the agent; and in response to authenticating the new model as being authorized for utilization by the agent, configuring at least one of a transport, a platform, or an application for access by the new model.

14. The system of claim 9, wherein the operations further comprise:

creating, deleting, or modifying a network policy based upon rules defined for agent communication.

15. The system of claim 9, wherein the operations further comprise:

deploying a plurality of agents as part of performing the network maintenance for a plurality of network components that include the network component, wherein the plurality of agents includes the agent;

defining an agent communication scheme for the plurality of agents; and designating a team manager for facilitating communication amongst the plurality of agents based upon the agent communication scheme.

16. The system of claim 9, wherein the operations further comprise:

forming an agent team as part of an artificial intelligence framework for performing a non-maintenance window task, wherein the agent team includes at least one of a methods of procedure (MOP) agent for processing network function installation MOPs, an automation agent to develop code from text associated with the network function installation MOPs, an execution agent for executing the code, a root cause analysis agent, or a configuration audit agent.

17. A non-transitory computer-readable medium storing instructions that when executed by one or more processors facilitate performance of operations comprising:

deploying an agent to perform a task as part of network maintenance for a network component, wherein the agent utilizes a model to execute procedural steps for performing the network maintenance;

generating and providing skill and context instructions to the agent as parameters defining how the agent is to execute the procedural steps for interacting with the network component;

monitoring execution of the agent according to the skill and context instructions to determine whether operational limits, defined by a descriptor for the agent, are violated; and in response to the agent violating the operational limits, terminating the agent and performing a remedial action.

18. The non-transitory computer-readable medium of claim 17, wherein the operations further comprise:

defining the skill and context instructions to include at least one of an application programming interface (API) description, a format supported by the network component, failure handling instructions, operational information for the network component, payloads expected by the network component, or tool navigation instructions for the network component.

19. The non-transitory computer-readable medium of claim 17, wherein the operations further comprise:

providing the agent with network site details for the network component, wherein the network site details include at least one of site namespaces, IP addresses, or network information.

20. The non-transitory computer-readable medium of claim 17, wherein the operations further comprise:

defining a team of agents based upon criteria including at least one of a minimum number of agents, a maximum number of agents, redundancy, resource limits, allowed models, allowed subnets that agents can create, a team theory, a consensus theory, allowed admin operations, a human review option, a load balancer agent option, a firewall agent option, or an auditor agent option.

* * * * *